Aug. 10, 1926.
K. KNUDSEN
1,595,667
RESILIENT WHEEL
Filed Sept. 29, 1925
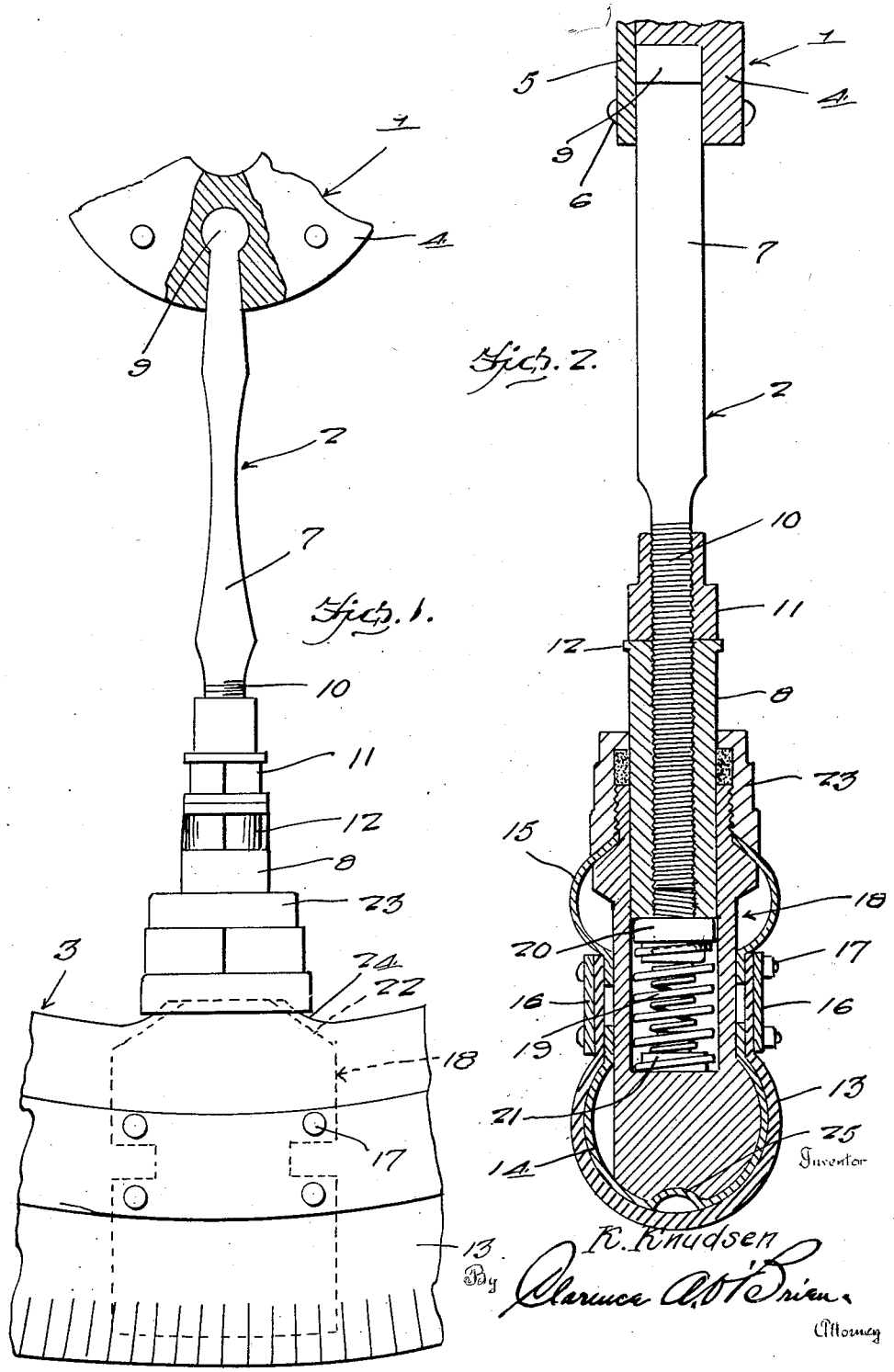

Patented Aug. 10, 1926.

1,595,667

UNITED STATES PATENT OFFICE.

KNUD KNUDSEN, OF HAY SPRINGS, NEBRASKA.

RESILIENT WHEEL.

Application filed September 29, 1925. Serial No. 59,296.

This invention relates to an improved resilient wheel which is especially, although not necessarily, designed for use upon heavy duty trucks, steel cars, and other comparatively heavy conveyances.

It has reference to the type of resilient wheel wherein the spokes are constructed to provide plungers and the rim is provided with sockets in which these plungers reciprocate, there being spring means in the cylinders to resist the inward movement of the plungers, whereby to absorb the shocks in the usual manner.

My principal aim is to generally improve upon wheels of this kind by providing one of comparative simplicity and durability wherein the rim is of special construction to permit the spring containing cylinder blocks to be firmly secured therein.

An equally important feature is the construction of each spoke which is constructed to permit the same to be radially adjusted and which carries means for aiding in connecting the spoke with the rim.

Another feature is the construction of the hub wherein the same is constructed to permit the spokes to be detachably connected therewith, the employing of bolts for directly connecting the spokes to the hub being unnecessary.

Other features and advantages of the invention will become apparent from the following description and drawings.

In the accompanying drawings forming a part of this application, and in which like numerals are employed to designate like parts throughout the same:—

Figure 1 is a fragmentary side view of a portion of the rim, one of the spokes, and a part of the hub with the face plate removed.

Fig. 2 is a view taken at approximate right angles to Fig. 1, showing in section, the structural details, whereby to disclose the relative arrangement of the same more plainly.

In the drawings, the reference character 1 designates generally the hub. 2 designates the improved spoke, and 3 the improved rim.

The hub comprises a ring-like member 4 having recesses formed in one flat face opening through the periphery. The recesses are key-hole shaped in appearance. The recesses are covered by a removable face plate 5 held in place by appropriate fastening 6.

Each spoke 2 comprises adjustably connected sections 7 and 8. The section 7 is formed at its inner end with a head 9 of the shape shown to fit into correspondingly shaped recesses in the ring-like member 4. The cover plate 5 serves to hold it in place without requiring the use of connecting bolts. The outer end portion of this spoke section 7 is screw threaded as indicated at 10. The section 8 is in the form of a sleeve and this is internally screw threaded for reception of the threaded stem 10. A lock nut 11 is on the stem and bears against the flat face portion 12 of the sleeve.

Considering now the construction of the rim, it will be seen that the same is of annular form and comprises a rubber tread 13 which surrounds a metal form or plate 14 of the kind shown plainly in Fig. 2. Inward of this rubber tread and metallic form is a metal channel 15, having outwardly bulged side walls. At circumferentially spaced points, this channel is formed with openings to accommodate the spokes. The metal channel is connected with the parts 13 and 14 by side rings 16 which are held in place by bolts 17. The approximate cross sectional shape of the rim is indicated in Fig. 2 and it will be seen that the shape is such as to accommodate cylinder blocks 18. These blocks are of the general outline indicated in dotted lines in Fig. 1. Each block is bored to form a cylinder in which the aforesaid spoke reciprocates.

In this cylinder are coiled springs 19 bearing at inner ends against a plug 20 and at their outer ends against a similar plug 21. The blocks are formed with shoulders 22 and with screw threaded necks extending through the openings in the aforesaid channel. A cap nut 23 is connected with the screw threaded neck and is slidably mounted on the sleeve portion of the spoke, packing being associated therewith as shown in Fig. 2.

In this connection, it will be noted that the openings formed in the channel 15 are surrounded by somewhat conical necks 24 and these necks are clamped by the beveled end of the cap nut 23 against the aforesaid shoulders 22. Also, the outer end portion of each block is formed with a groove in which the rib 25 of the metallic form 14 seats.

From the foregoing description it is obvious that the rim is of hollow box-like form and comprises an inner metal channel connected to the outer tread portion by side rings. At circumferentially spaced points are cylinder blocks containing the cushion forming spring. These blocks are arranged to receive the spokes, and the spokes are constructed by plungers to reciprocate in the cylinder. Thus a resilient spoke is provided and the spoke is capable of being radially adjusted to obtain the desired action.

It is believed that by considering this description in connection with the drawings, persons familiar with wheels of this kind will be able to obtain a clear understanding of the invention. Therefore a more lengthy description is thought unnecessary.

While the preferred embodiment of the invention has been shown and described, it is to be understood that minor changes coming within the field of invention claimed may be resorted to if desired.

Having thus described my invention, what I claim as new is:—

1. In a resilient wheel structure of the class described, a rim of hollow form comprising an outer tread member and an inner channel-shaped member, side rings connecting said channel-shaped member and said tread member together, a cylinder block located in said rim, said block being provided with a recess forming a cylinder and being provided at its inner end with a screw threaded neck, said channel-shaped member having an opening to which said threaded neck extends, means for connecting said neck with said rim, and a spoke having its outer end cooperable with said last-named means and with the recess in said block, there being a spring in said recess cooperable with the outer end of the spoke.

2. In a resilient wheel structure of the class described, a rim of hollow form comprising an outer tread member and an inner channel member, together with side rings connecting said members together, a cylinder block located in said rim, said block being connected with said rim, formed with a recess providing a cylinder socket, and with a screw threaded neck, said channel-shaped member having an opening through which said neck extends, a retaining nut threaded on said neck and cooperable with said channel shaped member, and an extensible spoke having a screw threaded stem and an adjustable sleeve mounted on said stem, said sleeve being slidably mounted in said socket, and a spring in said socket cooperable with the adjacent end of said spoke.

In testimony whereof I affix my signature.

KNUD KNUDSEN.